United States Patent
Tadakuma

(10) Patent No.: US 12,412,015 B2
(45) Date of Patent: Sep. 9, 2025

(54) SIMULATION MODEL AND SIMULATION METHOD

(71) Applicant: Mitsubishi Electric Corporation, Tokyo (JP)

(72) Inventor: Toshiya Tadakuma, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 986 days.

(21) Appl. No.: 17/506,974

(22) Filed: Oct. 21, 2021

(65) Prior Publication Data
US 2022/0222410 A1    Jul. 14, 2022

(30) Foreign Application Priority Data

Jan. 14, 2021 (JP) ................................ 2021-004182

(51) Int. Cl.
*G06F 30/367* (2020.01)
*G06F 119/06* (2020.01)
(Continued)

(52) U.S. Cl.
CPC ......... *G06F 30/367* (2020.01); *H03K 17/567* (2013.01); *H03K 17/687* (2013.01); *H10D 12/481* (2025.01); *G06F 2119/06* (2020.01)

(58) Field of Classification Search
CPC .. G06F 30/367; G06F 2119/06; H10D 12/481
(Continued)

(56) References Cited

U.S. PATENT DOCUMENTS

2005/0263853 A1* 12/2005 Tomomatsu ......... H10D 12/038
257/E29.066
2009/0014754 A1* 1/2009 Yoshikawa .......... H10D 12/038
257/E29.198
(Continued)

FOREIGN PATENT DOCUMENTS

| EP | 0 837 508 A2 | 4/1998 |
|---|---|---|
| JP | 2010-057268 A | 3/2010 |
| JP | 2020-088080 A | 6/2020 |

OTHER PUBLICATIONS

An Office Action; mailed by the China National Intellectual Property Administration of the People's Republic of China on Apr. 29, 2025, which corresponds to Chinese Patent Application No. 202210017151.2 and is related to U.S. Appl. No. 17/506,974.

*Primary Examiner* — Jack Chiang
*Assistant Examiner* — Suchin Parihar
(74) *Attorney, Agent, or Firm* — Studebaker Brackett PLLC

(57) ABSTRACT

An object of the present disclosure is to accurately simulate the operation of a CSTBT. The simulation model of a CSTBT includes a MOSFET, a diode whose cathode is connected to the drain of the MOSFET, capacitance $C_{GE}$ connected between a source and a gate of the MOSFET, capacitance $C_{CG}$ connected between a gate of the MOSFET and an anode of the diode, capacitance $C_{CE}$ connected between a source of the MOSFET and the anode of the diode, capacitance $C_{DG}$ connected between the drain and the gate of the MOSFET, and a behavioral power source $V_{DG}$ connected in series to the capacitance $C_{DG}$ between the drain and the gate of the MOSFET. The behavioral power source $V_{DG}$ performs a switching operation when gate-emitter voltage $V_{GE}$ of the CSTBT reaches a predetermined threshold value.

10 Claims, 19 Drawing Sheets

(51) Int. Cl.
*H03K 17/567* (2006.01)
*H03K 17/687* (2006.01)
*H10D 12/00* (2025.01)

(58) Field of Classification Search
USPC .......................................................... 716/111
See application file for complete search history.

(56) References Cited

U.S. PATENT DOCUMENTS

2017/0213908 A1* 7/2017 Fursin ................... H10D 62/106
2019/0312113 A1* 10/2019 Chen ..................... H02M 7/003
2020/0158774 A1 5/2020 Nakatani et al.
2020/0303507 A1* 9/2020 Yilmaz ................ H10D 64/117

\* cited by examiner

F I G. 2
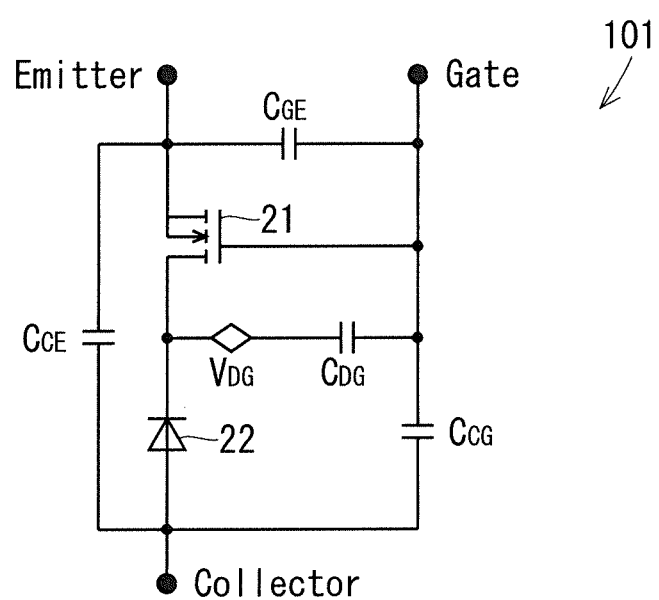

F I G. 6
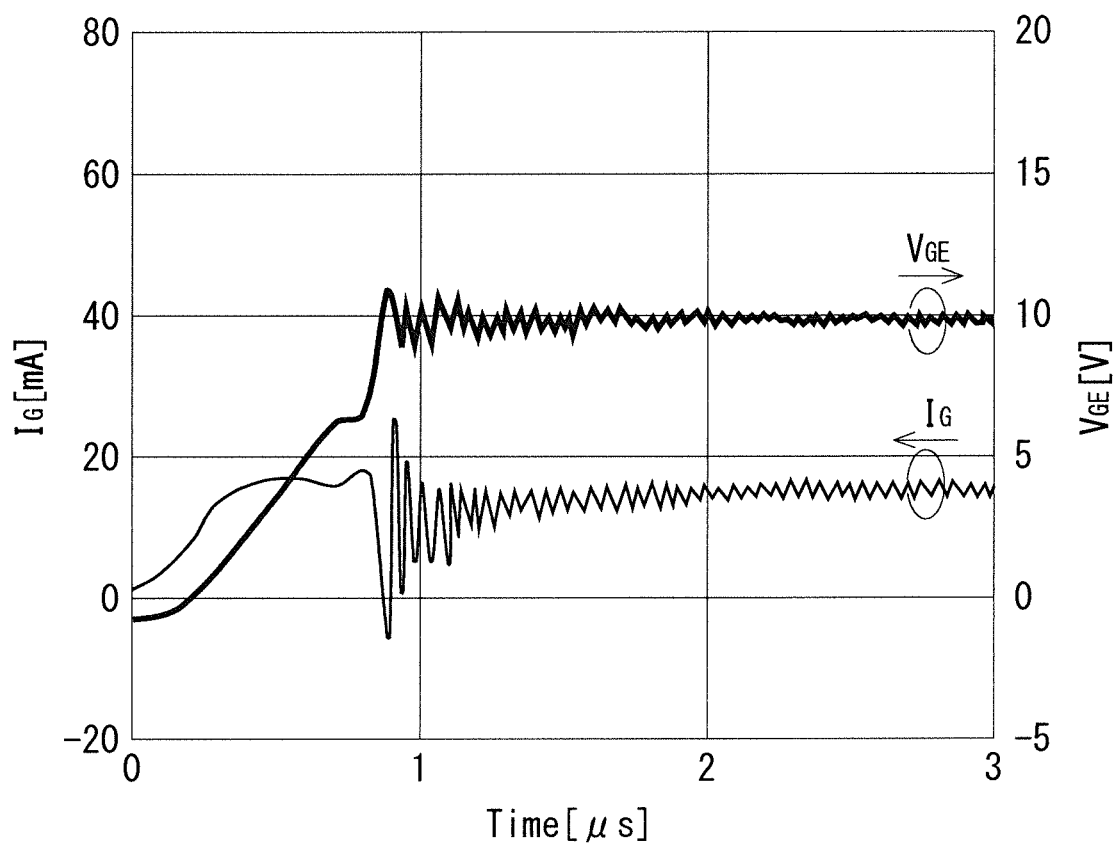

F I G. 8
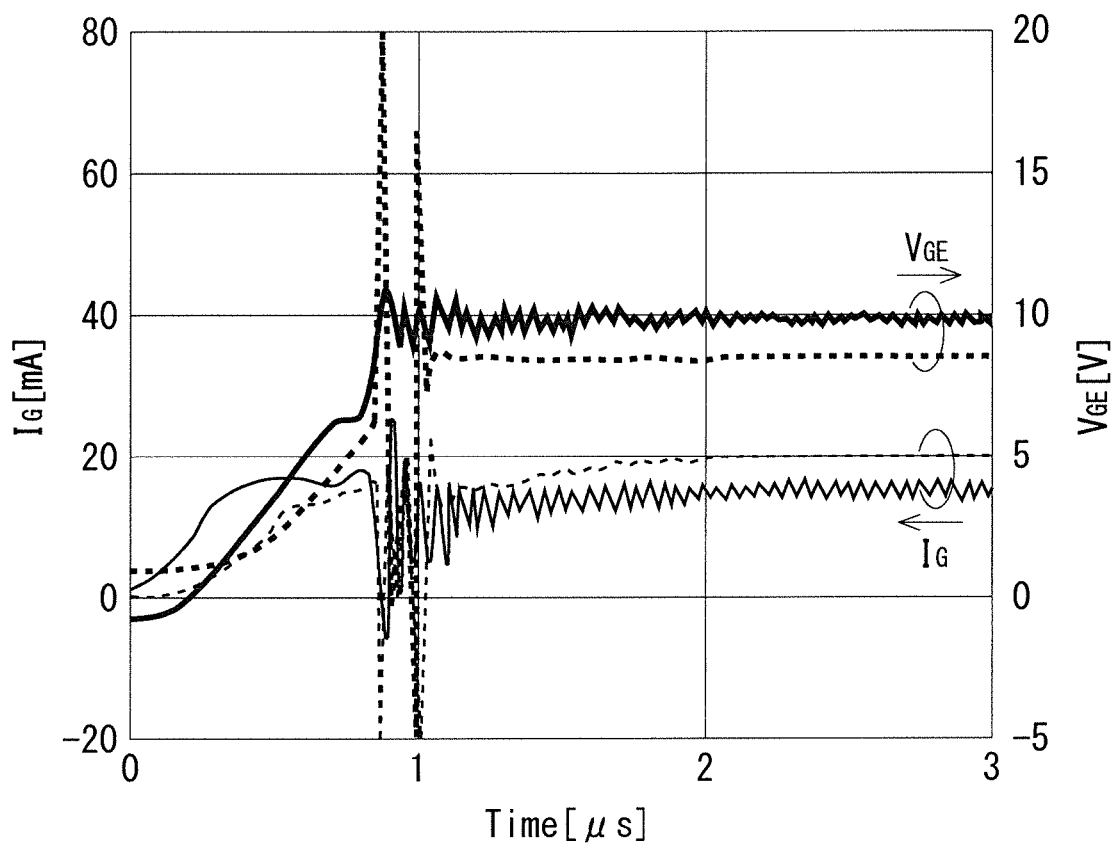

F I G. 1 2
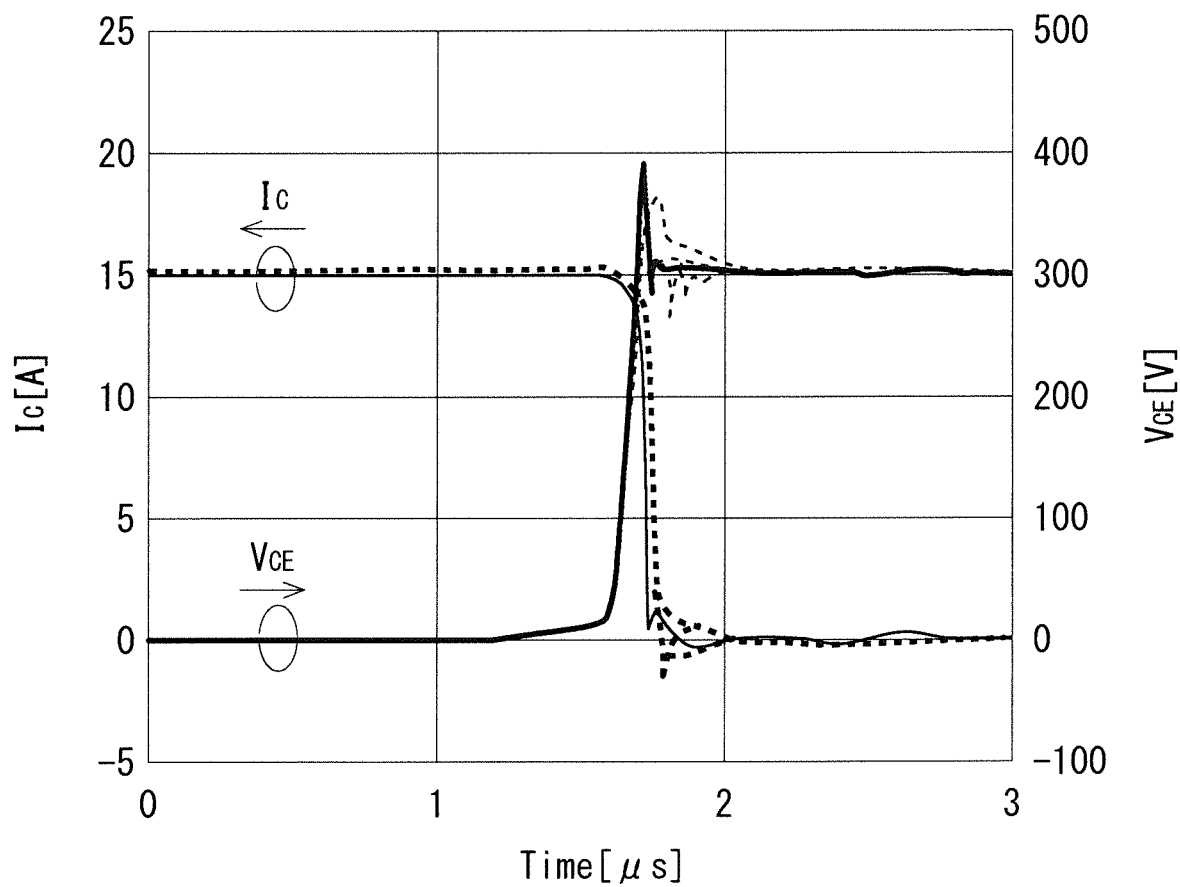

F I G. 1 3
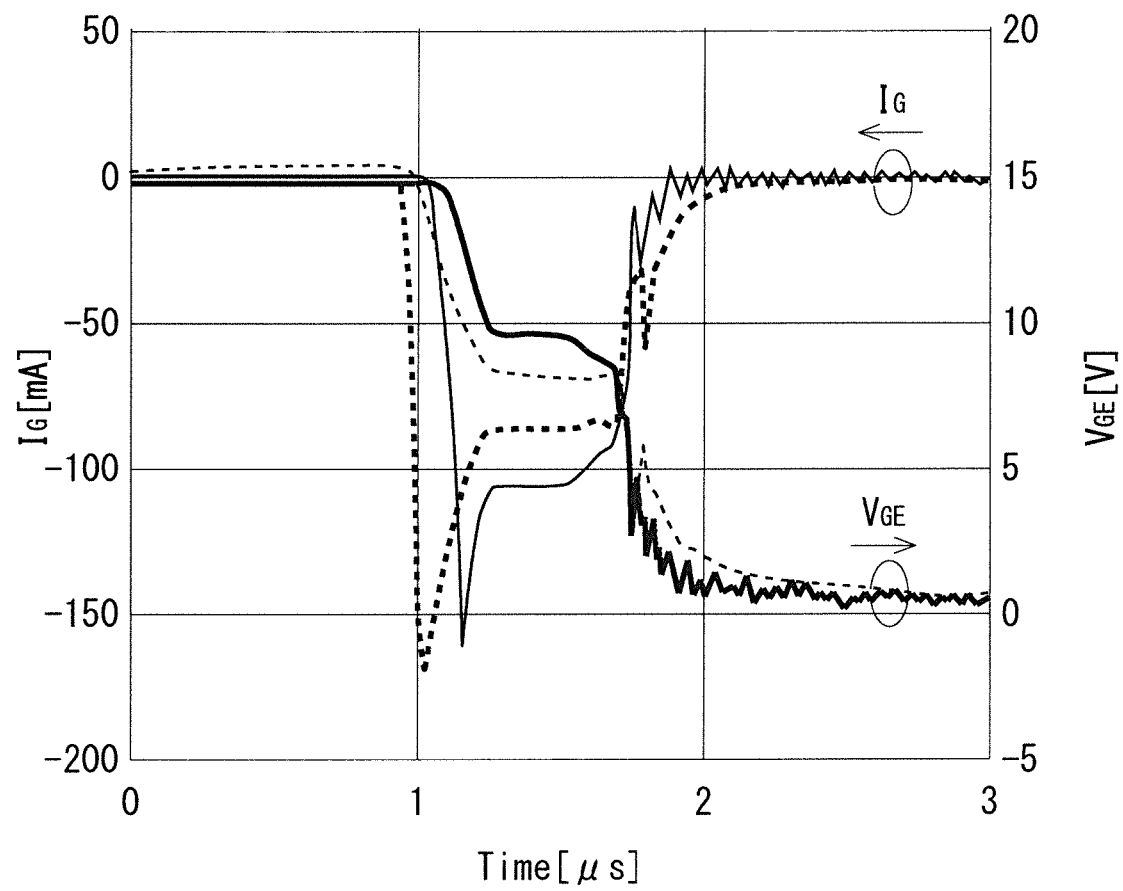

F I G. 1 6
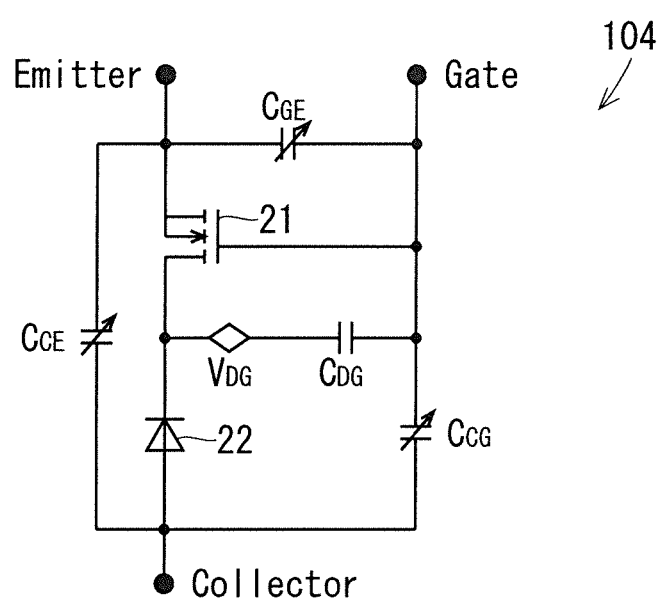

SIMULATION MODEL AND SIMULATION METHOD

BACKGROUND OF THE INVENTION

Field of the Invention

The present disclosure relates to a simulation of Carrier Stored Trench Bipolar Transistor (CSTBT).

Description of the Background Art

Generally, in the development of a power electronics device such as an inverter, a circuit configuration is first subject to simulation analysis and then to verification by trial production evaluation.

For the above simulation analysis, for example, a circuit simulation using a Simulation Program with Integrated Circuit Emphasis (SPICE) model is used.

The SPICE model is a model in which the electrical characteristics of a power semiconductor device such as a diode, a metal-oxide-semiconductor field-effect transistor (that is, a MOSFET), an insulated gate bipolar transistor (that is, an IGBT) are simulated and calculated.

For the accurate simulation of the electrical characteristics, the physical parameters of the device model are required to be extracted. Therefore, advanced knowledge of semiconductor physics is required.

However, in general, circuit designers are often not so much required to have knowledge about semiconductor physics, accordingly, a method that makes the extraction of physical parameters with high accuracy possible even without knowledge of semiconductor physics is required. As a method for solving such a problem, for example, a method described in Japanese Patent Application Laid-Open No. 2020-88080 is known.

The behavioral modeling of the IGBT described in Japanese Patent Application Laid-Open No. 2020-88080 does not reflect the Carrier Store (CS) layer; therefore, there is a problem that the operation of the CSTBT having the CS layer cannot be accurately expressed.

SUMMARY

The object of the technique of the present disclosure is to accurately simulate the operation of a CSTBT.

A simulation model of the present disclosure is a simulation model for simulation evaluating characteristics of a CSTBT being a trench gate type IGBT having a carrier storage layer. The simulation model of the present disclosure includes a MOSFET, a diode, capacitance $C_{GE}$, capacitance $C_{CG}$, capacitance $C_{CE}$, capacitance $C_{DG}$, and a behavioral power supply $V_{DG}$. The cathode of the diode is connected to the drain of the MOSFET. The capacitance $C_{GE}$ is connected between the source and the gate of the MOSFET and representing gate-emitter capacitance of the CSTBT. The capacitance $C_{CG}$ is connected between the gate of the MOSFET and the anode of the diode and representing gate-collector capacitance of the CSTBT. The capacitance $C_{CE}$ is connected between the source of the MOSFET and the anode of the diode and representing collector-emitter capacitance of the CSTBT. The capacitance $C_{DG}$ is connected between the drain and the gate of the MOSFET and representing drain-gate capacitance of the CSTBT. The behavioral power source $V_{DG}$ is connected in series to the capacitance $C_{DG}$ between the drain and the gate of the MOSFET and representing a drain-gate voltage of the CSTBT. The behavioral power source $V_{DG}$ performs a switching operation when gate-emitter voltage $V_{GE}$ of the CSTBT reaches a predetermined threshold value.

According to the simulation model of the present disclosure, the behavior of the CSTBT is simulated with high accuracy, in which the gate-emitter voltage $V_{GE}$ of the CSTBT sharply increases due to the switching of the behavioral power supply $V_{DG}$, causing the MOSFET channel to expand immediately and the current to start flowing sharply.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a diagram illustrating a simulation circuit of the CSTBT according to Embodiment 1;

FIG. 6 is a graph illustrating the actual waveforms of $V_{GE}$ and $I_G$ in the turn-on operation of the CSTBT;

FIG. 8 is a graph illustrating the simulation waveforms of $V_{GE}$ and $I_G$ in the turn-on operation of the CSTBT using the simulation circuit of FIG. 2;

FIG. 12 is a graph illustrating the simulation waveforms of $V_{CE}$ and $I_C$ in the turn-on operation of the CSTBT using the simulation circuit of FIG. 9;

FIG. 13 is a graph illustrating the simulation waveforms of $V_{GE}$ and $I_G$ in the turn-on operation of the CSTBT using the simulation circuit of FIG. 9;

FIG. 16 is a diagram illustrating a simulation circuit of a CSTBT according to Embodiment 4;

DESCRIPTION OF THE PREFERRED EMBODIMENTS

A. Embodiment 1

<A-1. Configuration>

Figure 1:
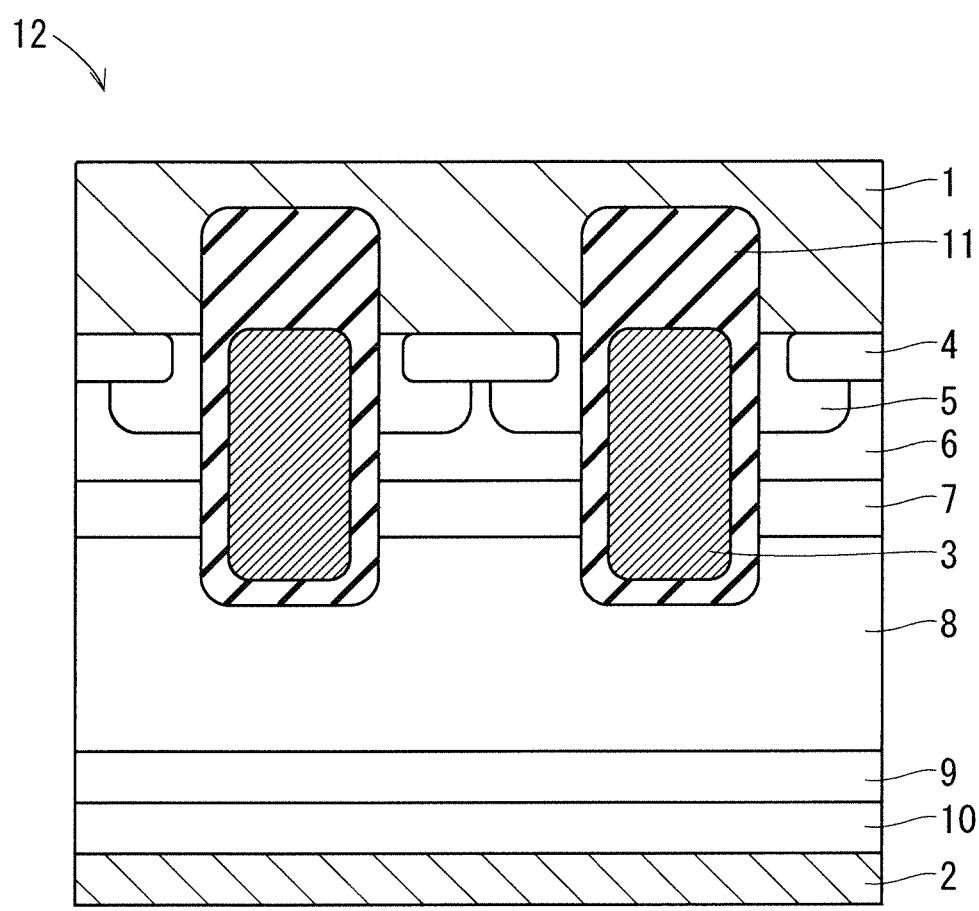
FIG. 1 is a cross-sectional view illustrating a vertical structure of a CSTBT.

FIG. 1 is a cross-sectional view illustrating a vertical structure of a CSTBT 12. As illustrated in FIG. 1, the CSTBT 12 includes an emitter electrode 1, a collector electrode 2, a gate electrode 3, a P+ layer 4, an N+ emitter layer 5, a channel-doped layer 6, a carrier store layer (CS layer) 7, an N− drift layer. 8, an N+ buffer layer 9, a P+ collector layer 10, and a gate oxide film 11. The CS layer 7, the channel-doped layer 6, the N+ emitter layer 5, and the P+ layer 4 are laminated in this order on a first main surface of the N− drift layer 8. Trenches are formed that extend through the N+ emitter layer 5, the channel-doped layer 6, and the CS layer 7 and reaches the N− drift layer 8, and in the trenches, the gate electrodes 3 and the gate oxide films 11 formed to cover the gate electrodes 3 are formed. The emitter electrode 1 is formed on the P+ layer 4 and the N+ emitter layer 5. The N+ buffer layer 9, the P+ collector layer 10, and the collector electrode 2 are formed in this order on a second main surface opposite to the first main surface of the N− drift layer 8.

FIG. 2 illustrates a simulation model 101 of the CSTBT 12 of Embodiment 1. The simulation model 101 is an equivalent circuit of the CSTBT 12 and is used for the simulation of the CSTBT 12. The simulation model is, for example, input into a computer and further displayed in a simulator.

Main elements of the simulation model 101 of the CSTBT 12 are a MOSFET 21 and a diode 22. The MOSFET 21 is composed of the N+ emitter layer 5, the channel-doped layer 6, the CS layer 7, the gate oxide film 11, and the gate electrode 3 of the CSTBT 12. The diode 22 is composed of the N− drift layer 8, the N+ buffer layer 9, and the P+ collector layer 10 of the CSTBT 12.

The gate of MOSFET 21 corresponds to the gate of the CSTBT 12, and the emitter of MOSFET 21 corresponds to the emitter of the CSTBT 12. The cathode of the diode 22 is connected to the drain of the MOSFET 21. The anode of diode 22 corresponds to the collector of the CSTBT 12.

The gate-emitter capacitance $C_{GE}$ of the CSTBT 12 is connected between the gate and emitter of the MOSFET 21.

The behavioral power source $V_{DG}$ and the drain-gate capacitance $C_{DG}$ of the CSTBT 12 are connected in series between the drain and gate of MOSFET 21. The behavioral power source $V_{DG}$ is a behavioral power source having a function of switching with an arbitrary voltage as a threshold value. For example, when the gate-emitter voltage $V_{GE}$ reaches the threshold voltage $V_{th}$ of the CSTBT 12, the behavioral power source $V_{DG}$ performs switching. Or, when the gate-emitter voltage $V_{GE}$ falls below the threshold voltage $V_{th}$ of the CSTBT 12, the behavioral power source $V_{DG}$ performs switching. It should be noted that, the behavioral power source $V_{DG}$ does not have to perform switching. The behavioral power source $V_{DG}$ can take a positive, negative, or 0 value with respect to the gate potential.

The drain-gate capacitance $C_{DG}$ is formed by CS layer 7 of the CSTBT 12. Although any value may be entered for the drain-gate capacitance $C_{DG}$, the design value is applied, for example.

The gate-collector capacitance $C_{CG}$ of the CSTBT 12 is connected between the gate of the MOSFET 21 and the anode of the diode 22.

The collector-emitter capacitance $C_{CE}$ of the CSTBT 12 is connected between the source of the MOSFET 21 and the anode of the diode 22.

Figure 3:
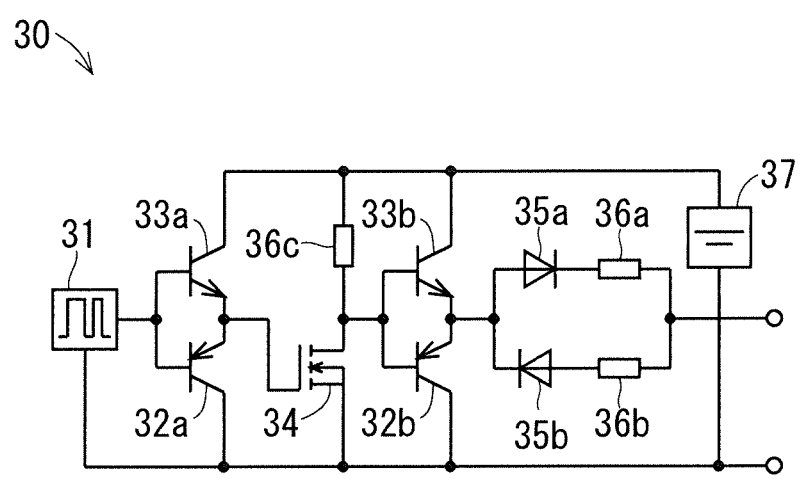
FIG. 3 is a diagram illustrating a simulation circuit of a drive circuit of the CSTBT.

FIG. 3 is a diagram illustrating a simulation model of a drive circuit 30 of the CSTBT 12. The drive circuit 30 is a gate drive circuit that applies a gate voltage to the gate terminal of the CSTBT 12, in other words, the MOSFET 21. The simulation model of the drive circuit 30 illustrated in FIG. 3 is an equivalent circuit of the drive circuit 30, and the configuration thereof includes an optocoupler 31, PNP transistors 32a, 32b, NPN transistors 33a, 33b, a MOSFET 34, diodes 35a, 35b, resistors 36a, 36b, 36c, and a power source 37.

The optocoupler 31 receives an input signal. The output of the optocoupler 31 is input to the bases of the PNP transistor 32a and the NPN transistor 33a. The emitter of the PNP transistor 32a and the emitter of the NPN transistor 33a are connected to the gate of the MOSFET 34. The collector of the NPN transistor 33a is connected to the power supply potential of the power source 37. The drain of the MOSFET 34 is connected to the power supply potential via the resistor 36c and is connected to the bases of the PNP transistor 32b and the NPN transistor 33b. The source of MOSFET 34 is connected to the reference potential.

The collector of the NPN transistor 33b is connected to the power supply potential, and the collector of the PNP transistor 32b is connected to the reference potential. The emitters of the PNP transistor 32b and the NPN transistor 33b are connected to the anode of the diode 35a and the cathode of the diode 35b, respectively. The cathode of the diode 35a is connected to the resistor 36a. The anode of the diode 35a is connected to the resistor 36b. Of both sides of the resistors 36a and 36b, the side opposite the side on which the diodes 35a and 35b are respectively connected is connected to the output terminal.

Figure 4:
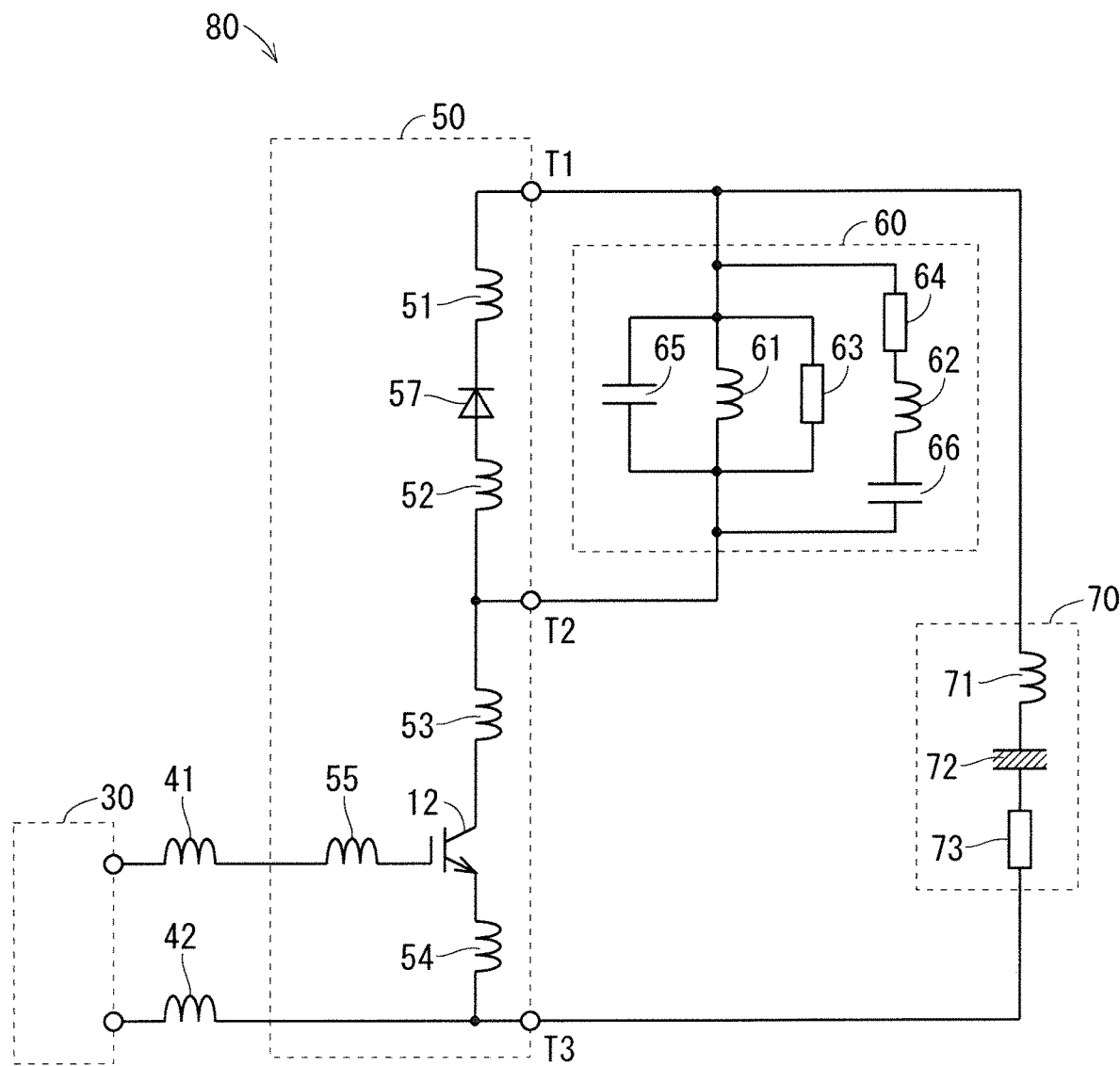
FIG. 4 is a diagram illustrating a simulation circuit of a test circuit of the CSTBT at a high frequency.

FIG. 4 is a diagram illustrating a simulation model 80 of a test circuit of the CSTBT 12. The simulation model 80 is an equivalent circuit of the test circuit of the CSTBT 12 at a high frequency. The simulation model 80 includes a substrate 50 to which the CSTBT 12 and the freewheeling diode 57 are die-bonded, the drive circuit 30, an inductive load 60, and a power supply circuit 70. The substrate 50 is represented by the freewheeling diode 57, an inductance 51 and an inductance 52 connected to the cathode and anode of the freewheeling diode 57, respectively, an inductance 53 connected to the inductance 52, the CSTBT 12 whose collector is connected to the inductance 53, and an inductance 55 and an inductance 54 connected to the gate and emitter of CSTBT 12, respectively. The inductance 54 is connected between the emitter of CSTBT 12 and the reference potential.

One output terminal of the drive circuit 30 is connected to the inductance 55 via an inductance 41, and the other output terminal is connected to the reference potential via an inductance 42. In FIG. 4, the simulation model 101 illustrated in FIG. 2 is applied to CSTBT 12.

The inductance 51 is connected between a first terminal T1 and the freewheeling diode 57 of the substrate 50. The inductance 52 is connected between a second terminal T2 and the freewheeling diode 57 of the substrate 50. A third terminal T3 of the substrate 50 is connected to the reference potential.

The inductive load 60 is connected between the first terminal T1 and the second terminal T2 of the substrate 50, and the power supply circuit 70 is connected between the first terminal T1 and the third terminal T3. The inductive load 60 is represented by a parallel connection of a series connection of a resistor 64, an inductance 62 and a capacitance 66, an inductance 61, a resistor 63 and a capacitance 65. The power supply circuit 70 is represented by an inductance 71, an electric field capacitor 72 and a resistor 73.

<A-2. Operation>

Figure 5:
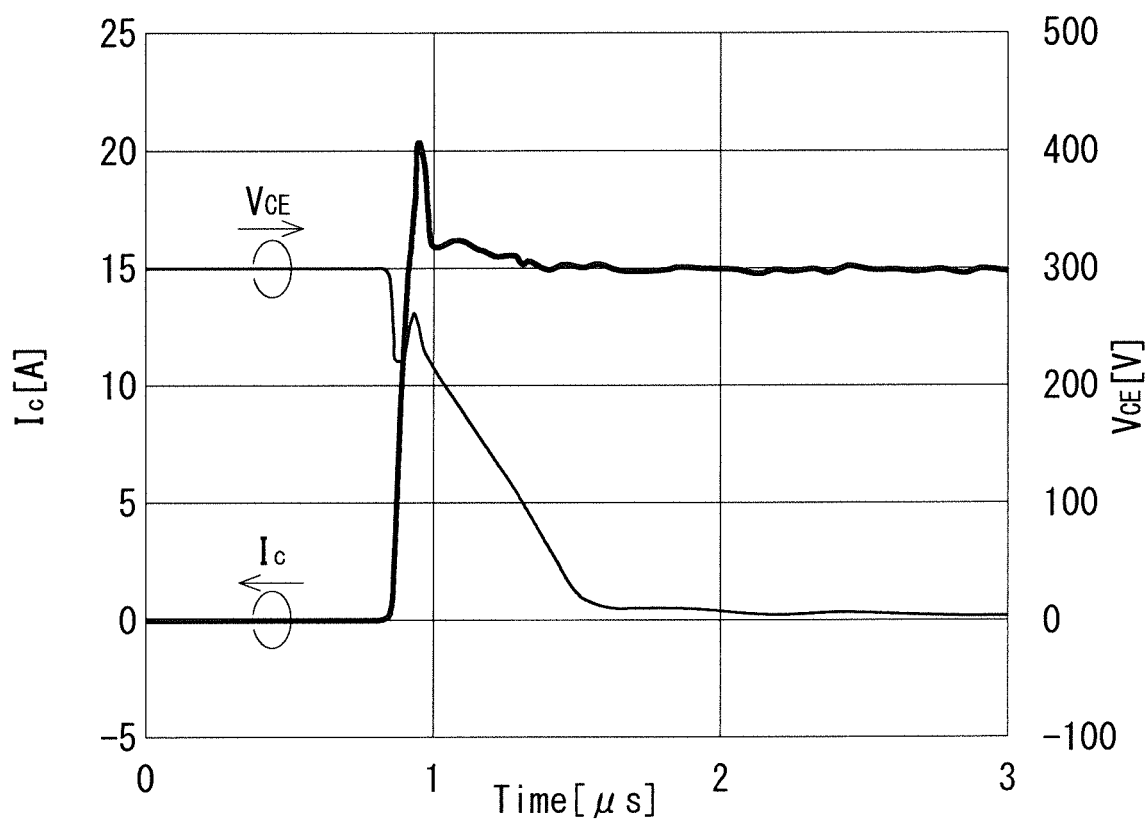
FIG. 5 is a graph illustrating the actual waveforms of $V_{CE}$ and $I_C$ in the turn-on operation of the CSTBT.

Representative examples of double pulse test results are illustrated in FIGS. 5 and 6. FIG. 5 illustrates measured values of the $V_{CE}$ and $I_C$ in the CSTBT 12. FIG. 6 illustrates measured values of the $V_{GE}$ and $I_G$ in the CSTBT 12. In FIGS. 5 and 6, the horizontal axis represents time [μs]. In FIG. 5, the vertical axes represent $I_C$ [A] and $V_{CE}$ [V], and in FIG. 6, the vertical axes represent $I_G$ [A] and $V_{GE}$ [V]. As illustrated in FIG. 5, $I_G$ of 15 [A] is flowing when $V_{CE}$ of 300 [V] is applied. As illustrated in FIG. 6, when the $V_{GE}$ reaches an arbitrary voltage, the $V_{GE}$ sharply increases due to the switching of the $V_{DG}$, so that the MOSFET channel immediately expands and the current starts to flow sharply.

Figure 7:
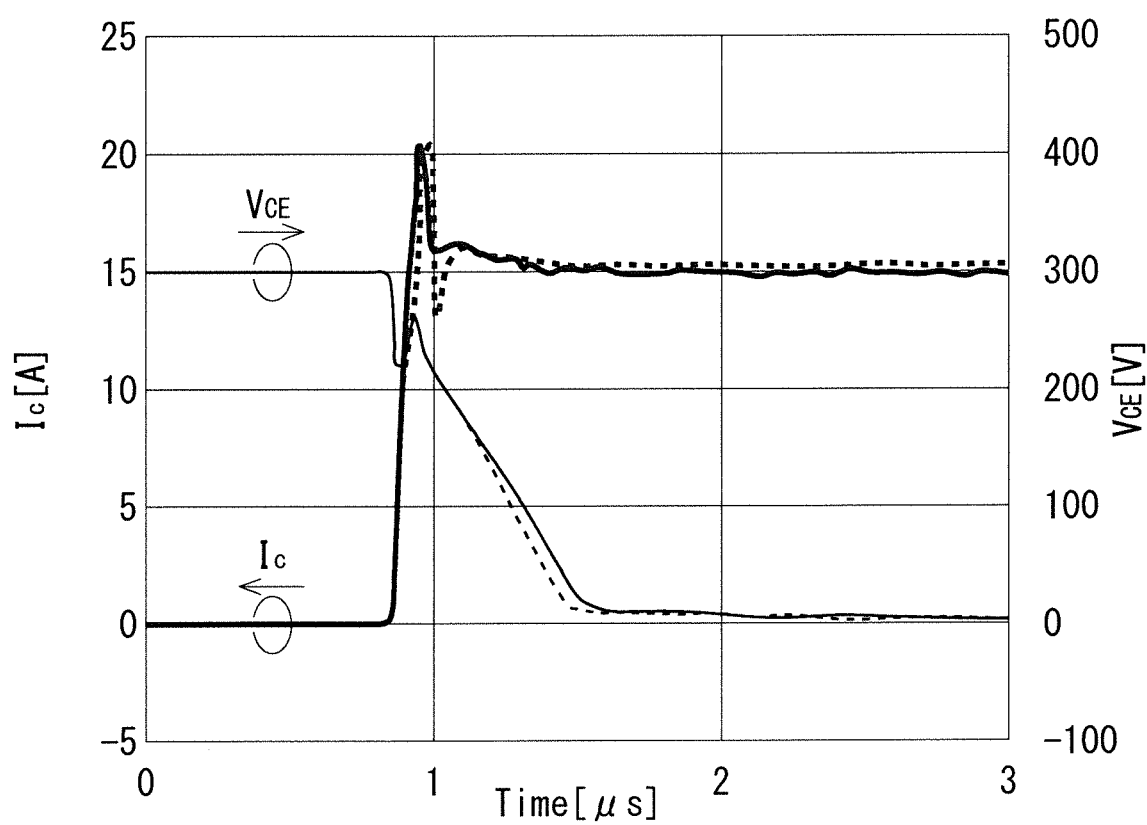
FIG. 7 is a graph illustrating the simulation waveforms of $V_{CE}$ and $I_C$ in the turn-on operation of the CSTBT using the simulation circuit of FIG. 2.

FIGS. 7 and 8 illustrate the simulation results of the double pulse test using the simulation model 80 of FIG. 4. The horizontal and vertical axes of FIG. 7 are the same as the horizontal and vertical axes of FIG. 5, and the horizontal and vertical axes of FIG. 8 are the same as the horizontal and vertical axes of FIG. 6. In FIGS. 7 and 8, the broken lines indicate the simulation result, and the solid lines indicate the measured values illustrated in FIGS. 5 and 6. From FIGS. 7 and 8, it can be seen that the simulation model 101 of FIG. 2 simulates the behaviors of the $V_{CE}$, $I_C$, $V_{GE}$, and $I_G$ in the CSTBT 12 with high accuracy.

<A-3. Effect>

The simulation model 101 of the CSTBT 12 of Embodiment 1 includes the MOSFET 21, the diode 22 whose cathode is connected to the drain of the MOSFET 21, the capacitance $C_{GE}$ connected between the source and gate of the MOSFET 21 and representing the gate-emitter capacitance of the CSTBT 12, the capacitance $C_{CG}$ connected between the gate of the MOSFET 21 and the anode of the diode 22 and representing the gate-collector capacitance of the CSTBT 12, the capacitance $C_{CE}$ connected between the source of the MOSFET 21 and the anode of the diode 22 and representing the collector-emitter capacitance of the CSTBT 12, the capacitance $C_{DG}$ connected between the drain and gate of the MOSFET 21 and representing the drain-gate capacitance of the CSTBT 12, and the behavioral power source $V_{DG}$ connected in series to the capacitance $C_{DG}$ between the drain and gate of the MOSFET 21 and representing the drain-gate voltage of the CSTBT 12.

Then, the behavioral power source $V_{DG}$ performs a switching operation when the gate-emitter voltage $V_{GE}$ of the CSTBT 12 reaches a predetermined threshold value. Therefore, according to the simulation model 101, the behavior of the CSTBT 12 is simulated with high accuracy, in which the gate-emitter voltage $V_{GE}$ of the CSTBT 12 sharply increases due to the switching of the behavioral power supply $V_{DG}$, causing the MOSFET channel to expand immediately and the current to start flowing sharply.

Also, the simulation model 101 may include a gate drive circuit that applies a voltage to the gate of the MOSFET 21. This allows simulating the gate voltage and the gate current of the CSTBT 12 with high accuracy.

B. Embodiment 2

<B-1. Configuration>

Figure 9:
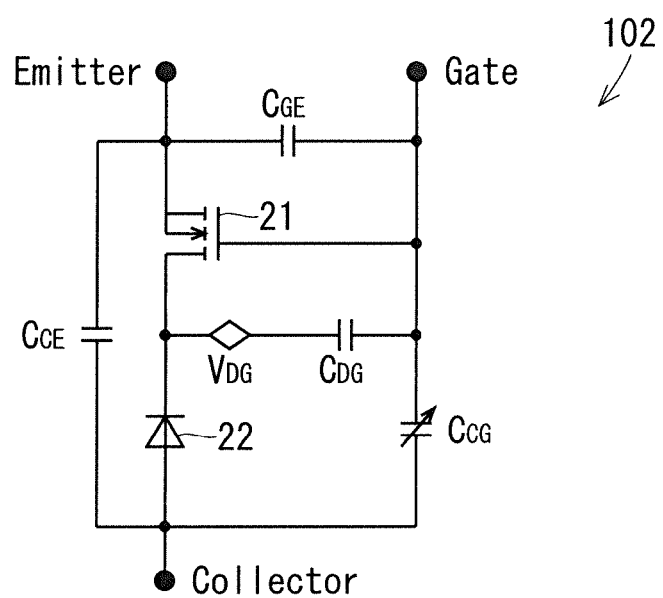
FIG. 9 is a diagram illustrating a simulation circuit of a CSTBT according to Embodiment 2.

FIG. 9 is a diagram illustrating a simulation model 102 of the CSTBT 12 of Embodiment 2. In the simulation model 102 of the CSTBT 12, a variable capacitance that changes depending on the gate-collector voltage $V_{CG}$, is applied to the gate-collector capacitance $C_{CG}$ of the CSTBT 12 in the simulation model 101 described in Embodiment 1, and except for that regard, the configuration is the same as the simulation model 101.

Figure 10:
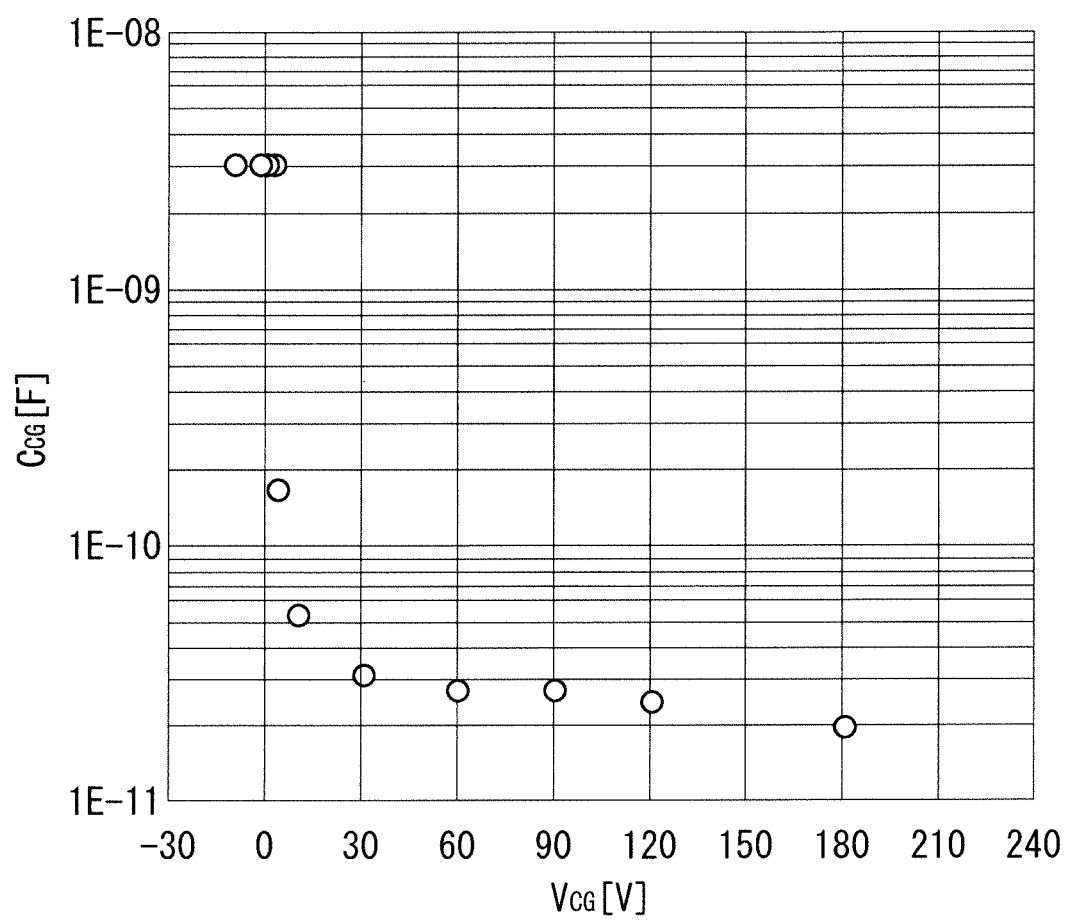
FIG. 10 is a graph illustrating the $V_{CG}$ dependence of $C_{CG}$.

FIG. 10 illustrates the actual measurement results of the gate-collector capacitance $C_{CG}$ of the CSTBT 12. The horizontal axis of FIG. 10 represents the gate-collector voltage $V_{CG}$ [V], and the vertical axis represents the gate-collector capacitance $C_{CG}$ [F]. As illustrated in FIG. 10, the gate-collector capacitance $C_{CG}$ varies depending on the gate-collector voltage $V_{CG}$. In order to reflect this phenomenon, the simulation model 102 in FIG. 9 represents the gate-collector capacitance $C_{CG}$ by the following formula with the gate-collector voltage $V_{CG}$ as a variable. Note that Ca, Ct, Vt, and Vc are arbitrary fixed values, y=arc tan (x) is the inverse function of y=tan (x), and π represents the circular constant.

$$C_{CG} = Ca \cdot (1 - Ct*2/\pi) \cdot \arctan\{(V_{CG} - Vt)/Vc\} \quad \text{[Expression 1]}$$

Figure 11:
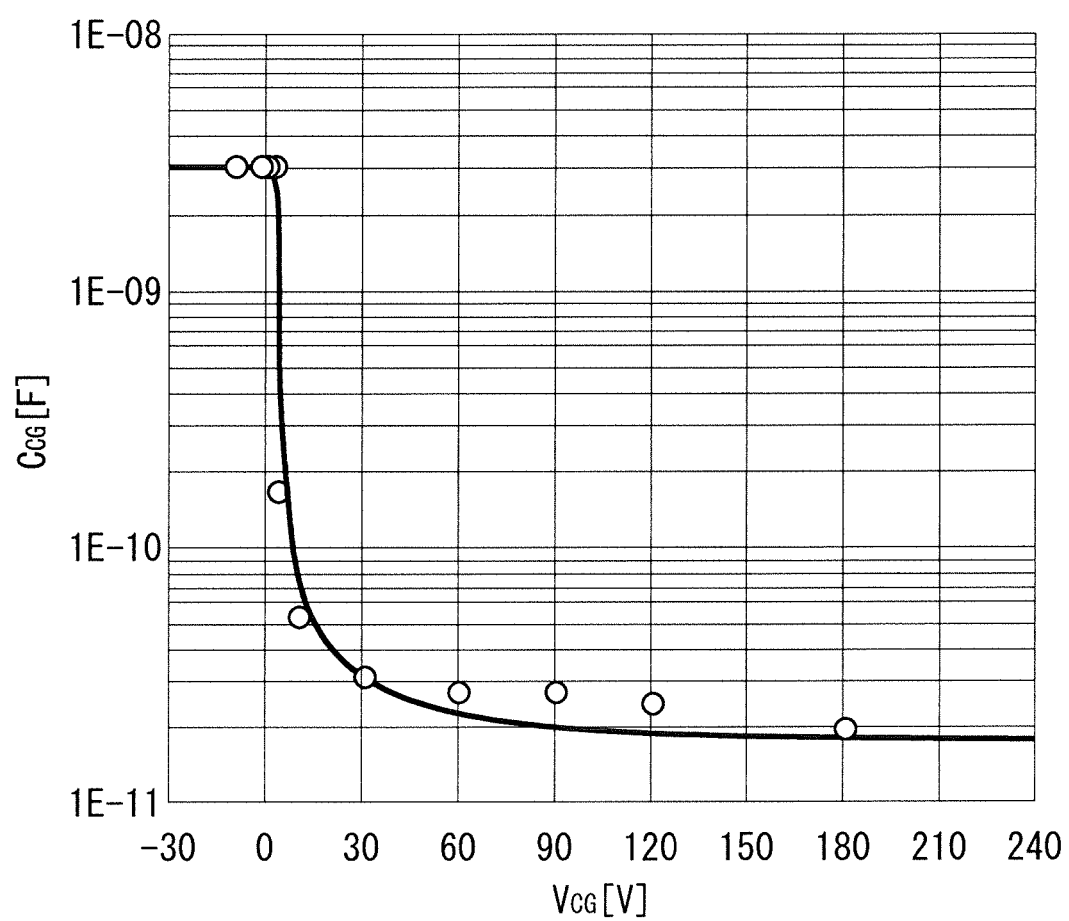
FIG. 11 is a graph illustrating $C_{CG}$ fitting.

According to Expression 1, the gate-collector capacitance $C_{CG}$ is fitted to a value close to the measured value as illustrated in FIG. 11.

<B-2. Operation>

FIGS. 12 and 13 illustrate the simulation results using the simulation model 102 of the CSTBT 12. That is, simulation of the behaviors of $V_{CE}$, $I_C$, $V_{GE}$, and $I_G$ in the CSTBT 12 was performed with the application of the simulation model 102 to the CSTBT 12 in the simulation model 80 of FIG. 4 in the same manner as in Embodiment 1. In FIGS. 12 and 13, the horizontal axis represents time [μs]. In FIG. 12, the vertical axes represent $I_C$ [A] and $V_{CE}$ [V], and in FIG. 13, the vertical axes represent $I_G$ [A] and $V_{GE}$ [V]. In FIGS. 12 and 13, the broken lines indicate the simulation result, and the solid lines indicate the measured values. From FIGS. 12 and 13, it can be seen that the simulation model 102 simulates the behaviors of the $V_{CE}$, $I_C$, $V_{GE}$, and $I_G$ in the CSTBT 12 with high accuracy.

<B-3. Effect>

In the simulation model 102 of the CSTBT 12 of Embodiment 2, the gate-collector capacitance $C_{CG}$ of the CSTBT 12 changes depending on the gate-collector voltage $V_{CG}$ of the CSTBT 12. Therefore, according to the simulation model 102, the gate-collector capacitance $C_{CG}$ that changes depending on the gate-collector voltage $V_{CG}$ of the CSTBT 12 can be accurately reflected.

Further, in the simulation model 102, the gate-collector capacitance $C_{CG}$ of CSTBT 12 is represented by Ca(1−Ct*2/π) arc tan {($V_{CG}$−Vt)/Vc}, with Ca, Ct, Vt, and Vc as constants and the gate-collector voltage $V_{CG}$ of the CSTBT 12 as variables. In this manner, according to the simulation model 102, the gate-collector capacitance $C_{CG}$ is represented by a continuous function of the gate-collector voltage $V_{CG}$, so the behaviors of $V_{CE}$, $I_C$, $V_{GE}$, and $I_G$ can be calculated with high accuracy and stability.

C. Embodiment 3

<C-1. Configuration>

Figure 14:
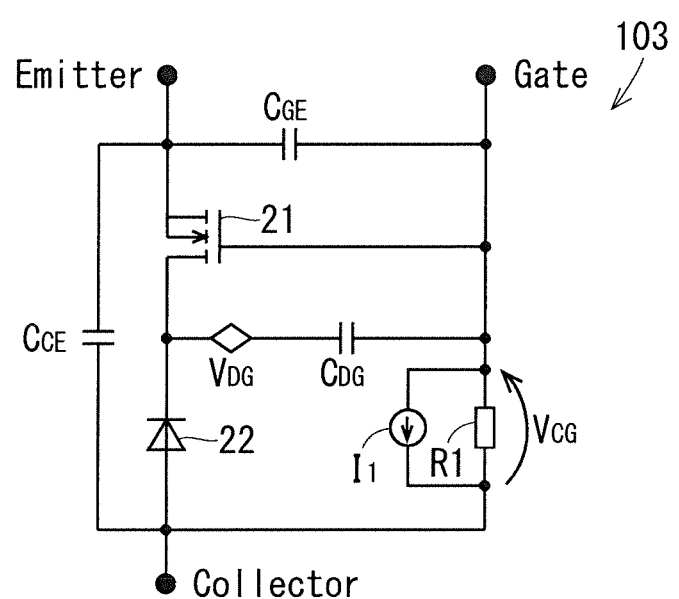
FIG. 14 is a diagram illustrating a simulation circuit of a CSTBT according to Embodiment 3.

FIG. 14 is a diagram illustrating a simulation model 103 of the CSTBT 12 of Embodiment 3. In the simulation model 103 of the CSTBT 12, the gate-collector capacitance $C_{CG}$ of the CSTBT 12 is represented by a parallel connection of the behavioral current source $I_1$ and a resistor R1 based on the gate-collector voltage $V_{CG}$, in the simulation model 101 described in Embodiment 1, and except for that regard, the configuration is the same as the simulation model 101. The behavioral current source $I_1$ is also referred to as a first behavioral current source.

Figure 15:
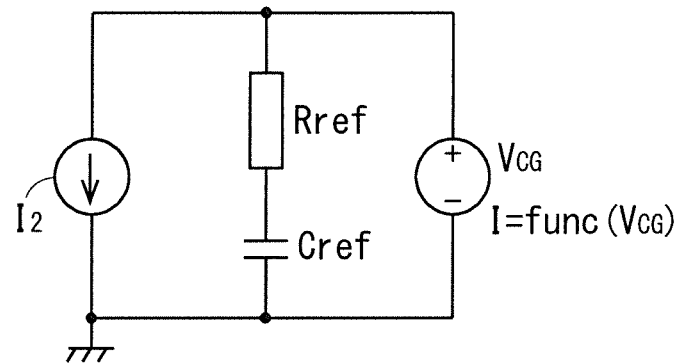
FIG. 15 is a diagram illustrating a circuit for calculating the current of a behavioral current source in the simulation circuit of FIG. 14.

The current of the behavioral current source $I_1$ in the simulation model 103 is calculated using the circuit illustrated in FIG. 15. The circuit illustrated in FIG. 15 is composed of a parallel connection of a series connection of a reference resistor Rref and a reference capacitance Cref, the behavioral voltage source $V_{CG}$ and a behavioral current source $I_2$. The behavioral current source $I_2$ is also referred to as a second behavioral current source. The current of the behavioral current source $I_2$ is represented by the gate-collector capacitance $C_{CG}$, the reference capacitance Cref, and the time derivative of the gate-collector voltage $V_{CG}$. The current I=func ($V_{CG}$) flowing through the behavioral voltage source $V_{CG}$ of the circuit illustrated in FIG. 15 corresponds to the current of the behavioral current source $I_1$ in the simulation model 103 of the CSTBT 12.

<C-2. Effect>

In the simulation model 103 of the CSTBT 12 of Embodiment 3, the gate-collector capacitance $C_{CG}$ of the CSTBT 12 is represented by a parallel connection of the behavioral current source $I_1$ being the first behavioral current source and the resistor R1, and, in the circuit composed of the series connection of the reference resistor Rref and the reference capacitance Cref, the behavioral current source $I_2$ being the second behavioral current source connected to both ends of the series connection, and the behavioral voltage source $V_{CG}$ representing the gate-collector voltage of the CSTBT 12 connected to both ends of the series connection, the current flowing through the second behavioral current source $I_2$ is represented by the gate-collector capacitance $C_{CG}$, the reference capacitance Cref, and the time derivative of the gate-collector voltage $V_{CG}$ of the CSTBT 12, and the current flowing through the behavioral voltage source $V_{CG}$ corresponds to the current of the behavioral current source $I_1$.

According to the simulation model 103, the gate-collector capacitance $C_{CG}$ can be calculated as a function of the gate-collector voltage $V_{CG}$ as a variable with the gate-collector capacitance $C_{CG}$ of the CSTBT 12 as a voltage variable capacitor. In addition, the gate-collector voltage $V_{CG}$ is applied to the reference resistor Rref and the reference capacitance Cref instead of the behavioral current source $I_2$; therefore, the calculation can be stabilized.

D. Embodiment 4

<D-1. Configuration>

FIG. 16 is a diagram illustrating a simulation model 104 of the CSTBT 12 of Embodiment 4. The simulation model 104 of the CSTBT 12 is represented by the collector-emitter capacitance $C_{CE}$ and the gate-emitter capacitance $C_{GE}$ as variable capacitances with the voltage applied to each component as variables in the simulation model 102 described in Embodiment 2.

The collector-emitter capacitance $C_{CE}$ is represented by the following expression with Ca, Ct, Vt, and Vc as arbitrary fixed values and $V_{CE}$ as a variable.

$$C_{CE}=Ca \cdot (1-Ct*2/\pi) \cdot \arctan\{(V_{CE}-Vt)/Vc\} \quad \text{[Expression 2]}$$

The gate-emitter capacitance $C_{GE}$ is represented by the following expression with Ca, Ct, Vt, and Vc as arbitrary fixed values and $V_{GE}$ as a variable.

$$C_{GE}=Ca \cdot (1-Ct*2/\pi) \cdot \arctan\{(V_{GE}-Vt)/Vc\} \quad \text{[Expression 3]}$$

In FIG. 16, although both the collector-emitter capacitance $C_{CE}$ and the gate-emitter capacitance $C_{GE}$ are represented as variable capacitances, only one of them may be represented as a variable capacitance.

<D-2. Effect>

In the simulation model 104 of the CSTBT 12 of Embodiment 4, the collector-emitter capacitance $C_{CE}$ of the CSTBT 12 may change depending on the collector-emitter voltage $V_{CE}$ of the CSTBT 12. Further, the gate-emitter capacitance $C_{GE}$ of the CSTBT 12 may change depending on the gate-emitter voltage $V_{GE}$ of the CSTBT 12. With such a configuration, according to the simulation model 104 of the CSTBT 12, the stable representation of the $V_{GE}$ dependence of $C_{GE}$ or the $V_{CE}$ dependence of $C_{CE}$ is ensured.

E. Embodiment 5

<E-1. Configuration>

Figure 17:
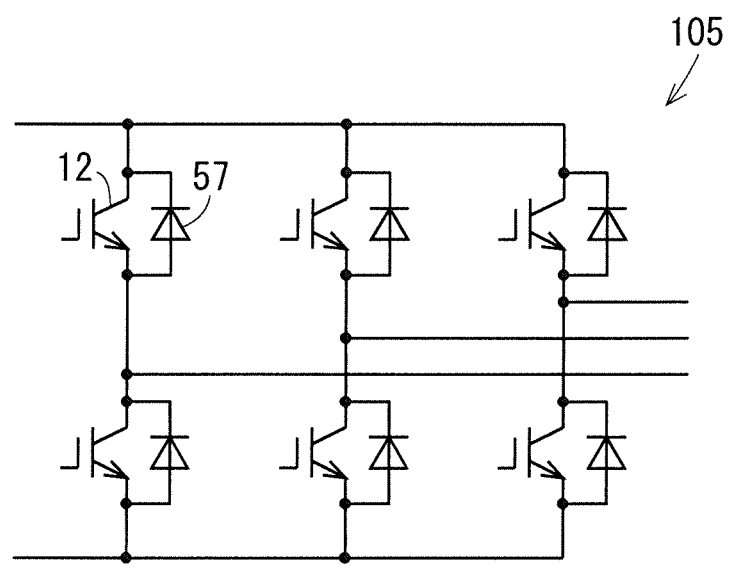
FIG. 17 is a diagram illustrating a simulation circuit of a 6in1 module having the CSTBT.

FIG. 17 illustrates a simulation model 105 of a semiconductor module of Embodiment 5. The semiconductor module represented by the simulation model 105 is a 6in1 module to which the CSTBT 12 is applied. That is, the 6in1 module has six pairs consisting of the CSTBT 12 and the freewheeling diode 57 connected in antiparallel to the CSTBT 12. To the CSTBT 12 in the simulation model 105, the simulation model 101 to 104 of the CSTBT 12 in any one of Embodiments 1 to 4 is applied.

<E-2. Effect>

The simulation model 105 of the semiconductor module of Embodiment 5 is a simulation model of a 6in1 having the CSTBT 12, and any simulation model 101 to 104 of any of Embodiment 1 to 4 is applied to the CSTBT 12 of the 6in1 module. Therefore, according to the simulation model 105, the behavior of the CSTBT 12 can be represented as the 6in1 module.

F. Embodiment 6

<F-1. Configuration>

Figure 18:
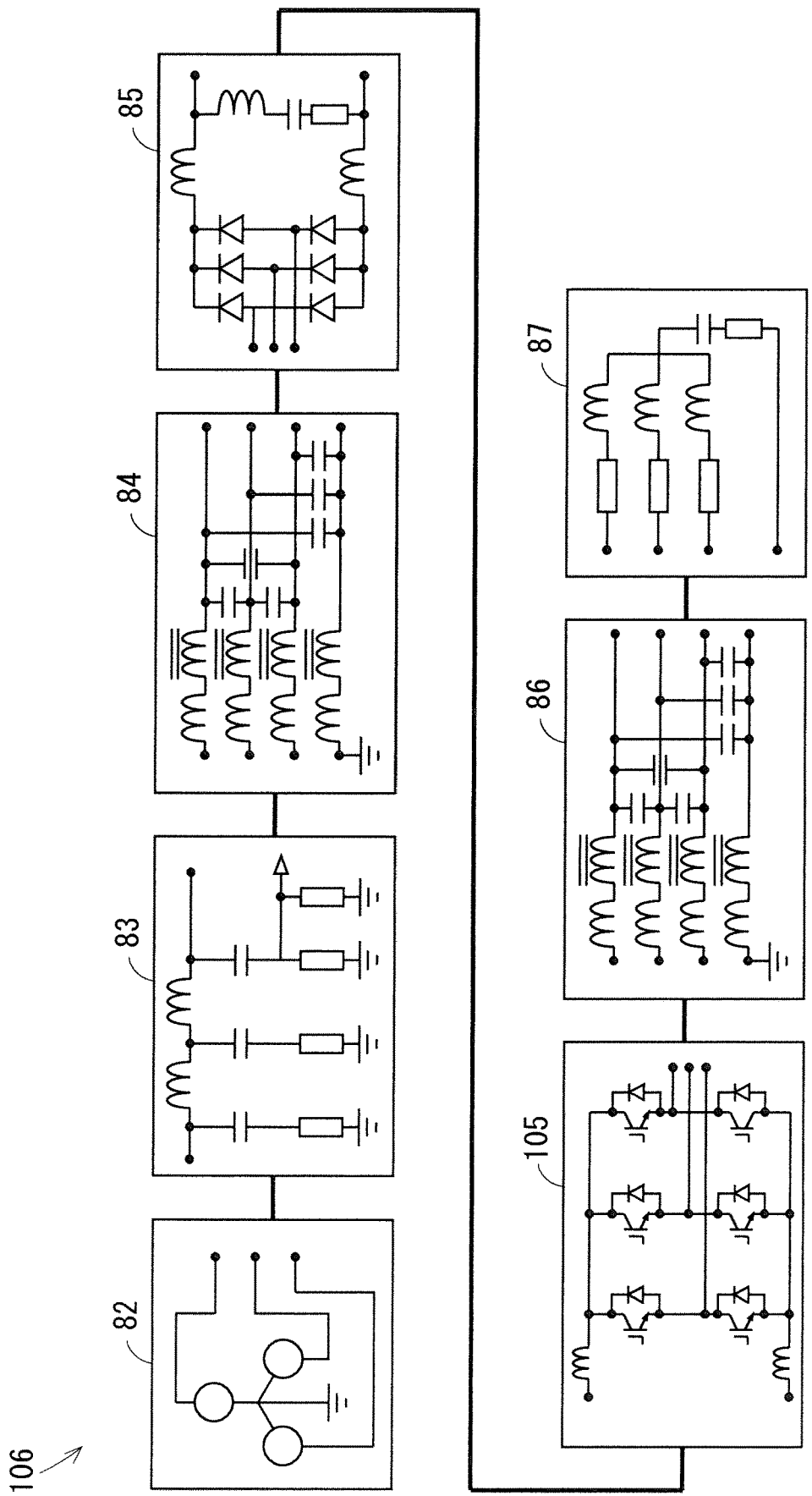
FIG. 18 is a diagram illustrating a simulation circuit of a conduction noise evaluation system using the simulation circuit of the 6in1 module illustrating in FIG. 17.

FIG. 18 illustrates a simulation model 106 of the conduction noise evaluation system of Embodiment 6. As illustrated in FIG. 18, the simulation model 106 includes a power supply circuit model 82, an LISN model 83, a first cable model 84, a rectifier model 85, a 6in1 module simulation model 105, a second cable model 86, and a motor model 87.

The power supply circuit model 82 is, for example, a simulation model of a three-phase power supply circuit. The LISN model 83 is a simulation model of the LISN, and is provided in the following stage of the power supply circuit model 82. The first cable model 84 is, for example, a simulation model of a three-phase four-wire cable, and is provided in the following stage of the LISN model 83. The rectifier model 85 is a simulation model of a rectifier and a smoothing capacitor, and is provided in the following stage of the first cable model 84. The simulation model 105 is a simulation model of the 6in1 module described in Embodiment 5, and is provided in the following stage of the rectifier model 85. The second cable model 86 is, for example, a simulation model of a three-phase four-wire cable, and is provided in the following stage of the simulation model 105. The motor model 87 is a simulation model of a motor, and is provided in the following stage of the second cable model 86.

Conductive noise can be detected at the output terminal of the LISN by performing analysis with Transient using the simulation model 106 illustrated in FIG. 18. In addition, the profile of conduction noise is output by performing frequency transformation such as Discrete Fourier Transform (DFT), Fast Fourier Transform (FFT), or wavelet transformation on at least a part of the detected conduction noise.

<F-2. Operation>

According to the simulation model 106, analysis of conduction noise (noise terminal voltage) or common mode current in accordance with the characteristics of the CSTBT 12 incorporated in a Dual-In-Line Package Intelligent Power Module (DIPIPM) such as 6in1 module can be performed. Then, according to the simulation model 106, identification of the dominant part of the frequency domain determined as noise can be performed by analyzing the current in the common mode or the differential mode using the power device as the signal source.

Figure 19:
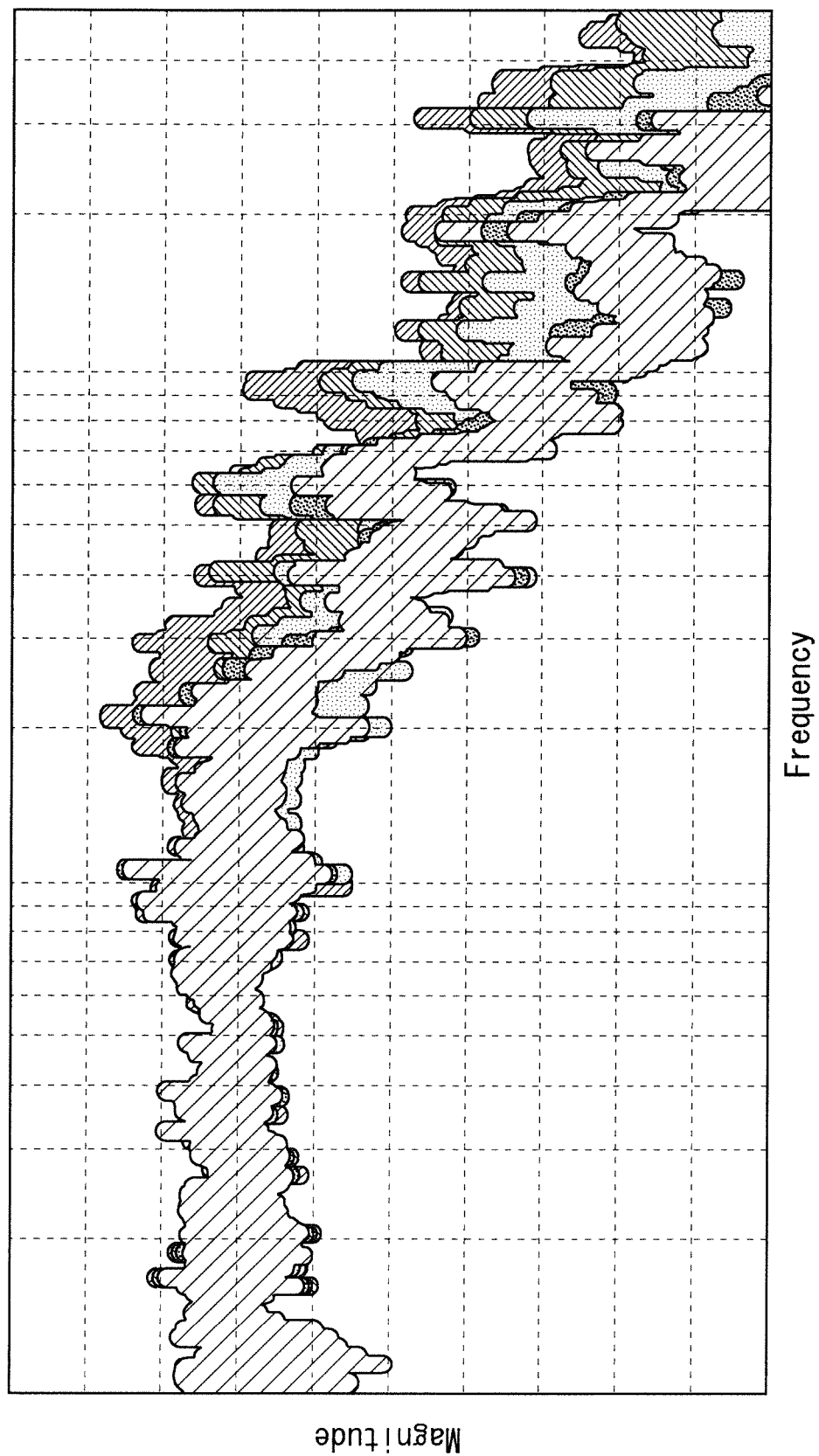
FIG. 19 is a diagram illustrating an analysis result of conduction noise by the simulation circuit of FIG. 18.

FIG. 19 illustrates the results of simulating the conduction noise in the simulation model 106 for a plurality of cases in which the concentrations of the CS layer 7 of the CSTBT 12 are different.

<F-3. Effect>

The simulation model 106 of the conduction noise evaluation system of Embodiment 6 includes the power supply circuit model 82 being a simulation model of a power supply circuit, the LISN model 83 provided in the following stage of the power supply circuit model 82 and being a simulation model of an LISN, the first cable model 84 provided in the following stage of the LISN model 83 and being a simulation model of a cable, the rectifier model 85 provided in the following stage of the first cable model 84 and being a simulation model of a rectifier and a smoothing capacitor, the simulation model 105 provided in the following stage of the rectifier model 85, the second cable model 86 provided in the following stage of the simulation model 105 and being a simulation model of a cable, and the motor model 87 being a simulation model of a motor, and provided in the following stage of the second cable model 86. Therefore, according to the simulation model 106, evaluation of the conduction noise in accordance with the characteristics of the CSTBT 12 can be performed.

The embodiments can be combined, appropriately modified or omitted, without departing from the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A simulation model for simulation evaluating characteristics of a CSTBT being a trench gate type IGBT having a carrier storage layer, the simulation model comprising:
   a MOSFET;
   a diode whose cathode is connected to a drain of the MOSFET;
   capacitance $C_{GE}$ connected between a source and a gate of the MOSFET and representing gate-emitter capacitance of the CSTBT;
   capacitance $C_{CG}$ connected between a gate of the MOSFET and an anode of the diode and representing gate-collector capacitance of the CSTBT;
   capacitance $C_{CE}$ connected between a source of the MOSFET and the anode of the diode and representing collector-emitter capacitance of the CSTBT;
   capacitance $C_{DG}$ connected between the drain and the gate of the MOSFET and representing drain-gate capacitance of the CSTBT; and
   a behavioral power source $V_{DG}$ connected in series to the capacitance $C_{DG}$ between the drain and the gate of the MOSFET and representing drain-gate voltage of the CSTBT, wherein
   the behavioral power source $V_{DG}$ performs a switching operation when a voltage is applied to the gate of the MOSFET and gate-emitter voltage $V_{GE}$ of the CSTBT reaches a predetermined threshold value.

2. The simulation model according to claim 1, wherein the capacitance $C_{CG}$ varies depending on the gate-collector voltage $V_{CG}$ of the CSTBT.

3. The simulation model according to claim 2, wherein the capacitance CG is represented by Ca(1−Ct*2/π) arc tan $\{(V_{CG}−Vt)/Vc\}$, with Ca, Ct, Vt, and Vc as constants and the gate-collector voltage $V_{CG}$ of the CSTBT as variables.

4. The simulation model according to claim 1, wherein the capacitance $C_{CG}$ is represented by a parallel connection of a first behavioral current source and a resistor, and,
   in a circuit composed of a series connection of a reference resistor and a reference capacitance,
   a second behavioral current source connected to both ends of the series connection, and
   a behavioral voltage source representing the gate-collector voltage $V_{CG}$ of the CSTBT connected to both ends of the series connection,
   a current flowing through the second behavioral current source is represented by time derivative of the capacitance $C_{CG}$, the reference capacitance, and the gate-collector voltage $V_{CG}$ of the CSTBT, and
   a current flowing through the behavioral voltage source corresponds to a current of the first behavioral current source.

5. The simulation model according to claim 1, wherein the capacitance $C_{CE}$ varies depending on a collector-emitter voltage $V_{CE}$ of the CSTBT.

6. The simulation model according to claim 1, wherein the capacitance $C_{GE}$ varies depending on the gate-emitter voltage $V_{GE}$ of the CSTBT.

7. A simulation model of a 6in1 module having the CSTBT, wherein
   the simulation model according to claim 1 is applied to the CSTBT of the 6in1 module.

8. The simulation model according to claim 1, further comprising
   a gate drive circuit that applies a voltage to the gate of the MOSFET.

9. The simulation model comprising:
   a power supply circuit model being a simulation model of a power supply circuit;
   an LISN model provided in a following stage of the power supply circuit model and being a simulation model of an LISN;
   a first cable model provided in a following stage of the LISN model and being a simulation model of a cable;
   a rectifier model provided in a following stage of the first cable model and being a simulation model of a rectifier and a smoothing capacitor;
   a simulation model according to claim 7, provided in a following stage of the rectifier model;
   a second cable model provided in a following stage of the simulation model according to claim 7 and being a simulation model of a cable; and
   a motor model provided in a following stage of the second cable model and being a simulation model of a motor.

10. A simulation method for evaluating characteristics of a CSTBT being a trench gate type IGBT having a carrier storage layer, wherein the simulation method evaluates characteristics of the CSTBT using a simulation model, the simulation model including:

a MOSFET, a diode whose cathode is connected to a drain of the MOSFET, capacitance $C_{GE}$ connected between a source and a gate of the MOSFET and representing gate-emitter capacitance of the CSTBT, capacitance $C_{CG}$ connected between a gate of the MOSFET and an anode of the diode and representing gate-collector capacitance of the CSTBT, capacitance $C_{CE}$ connected between a source of the MOSFET and the anode of the diode and representing collector-emitter capacitance of the CSTBT, capacitance $C_{DG}$ connected between the drain and the gate of the MOSFET and representing drain-gate capacitance of the CSTBT, and a behavioral power source $V_{DG}$ connected in series to the capacitance $C_{DG}$ between the drain and the gate of the MOSFET and representing drain-gate voltage of the CSTBT, and the method comprising:

applying a voltage to the gate of the MOSFET; and operating the behavioral power source $V_{DG}$ to perform a switching operation when gate-emitter voltage $V_{GE}$ of the CSTBT reaches a predetermined threshold value.

\* \* \* \* \*